(12) United States Patent
Ducrou et al.

(10) Patent No.: US 9,021,069 B2
(45) Date of Patent: Apr. 28, 2015

(54) PREVENTING DEREGISTRATION FROM FLEET ACCOUNTS

(75) Inventors: Jon Robert Ducrou, Seattle, WA (US); Brandon J. Smith, Seattle, WA (US); Christopher M. Brennan, Seattle, WA (US); Kenneth O. Sanders, II, Seattle, WA (US); Erik J. Miller, Seattle, WA (US); David M. Lerner, Seattle, WA (US); Andrew Budker, Seattle, WA (US); Marcus A. Barry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 13/534,662

(22) Filed: Jun. 27, 2012

(65) Prior Publication Data

US 2014/0006567 A1   Jan. 2, 2014

(51) Int. Cl.
| | |
|---|---|
| G06F 15/177 | (2006.01) |
| G06F 15/173 | (2006.01) |
| H04L 12/24 | (2006.01) |
| H04L 29/06 | (2006.01) |
| H04W 4/00 | (2009.01) |
| G06Q 10/00 | (2012.01) |

(52) U.S. Cl.
CPC ............ *H04L 41/0803* (2013.01); *H04L 63/10* (2013.01); *G06F 15/177* (2013.01); *H04L 41/0806* (2013.01); *H04W 4/001* (2013.01); *G06Q 10/00* (2013.01)

(58) Field of Classification Search
CPC .............................. H04L 63/10; G06F 15/177
USPC .................................................. 709/220–224
See application file for complete search history.

(56) References Cited

U.S. PATENT DOCUMENTS

| | | | |
|---|---|---|---|
| 8,234,302 B1 * | 7/2012 | Goodwin et al. ............. | 707/783 |
| 2004/0234060 A1 | 11/2004 | Tammi et al. | |
| 2005/0015298 A1 | 1/2005 | Cipriani | |
| 2005/0143941 A1 | 6/2005 | Forth et al. | |

(Continued)

FOREIGN PATENT DOCUMENTS

| | | |
|---|---|---|
| WO | WO0133430 | 5/2001 |
| WO | WO2006093971 | 9/2006 |
| WO | WO2011022053 | 2/2011 |

OTHER PUBLICATIONS

The PCT Search Report and Written Opinion mailed Nov. 29, 2013 for PCT application No. P5277-WO, 12 pages.

*Primary Examiner* — Jeong S Park
(74) *Attorney, Agent, or Firm* — Lee & Hayes, PLLC

(57) ABSTRACT

This disclosure describes, in part, techniques for managing access to a fleet account of mobile electronic devices. For instance, an administrator of a business and educational institution may place an order with an offering service to purchase a large number of eBook reader devices. The offering service identifies that the business and educational institution is ordering a fleet of devices. Furthermore, each of the devices ordered are associated or registered to a managed or fleet account controlled by the administrator of the business and educational institution. The techniques described herein prevent an individual user of a fleet device from de-registering the device from the managed account, and also allow an account administrator to alter preferred settings of the managed account. Further, techniques are described for allowing a user of a device to opt-in or associate their device with the account.

29 Claims, 13 Drawing Sheets

(56) References Cited

U.S. PATENT DOCUMENTS

| | | | |
|---|---|---|---|
| 2007/0209067 A1* | 9/2007 | Fogel | 726/11 |
| 2008/0104200 A1* | 5/2008 | Kushwaha et al. | 709/217 |
| 2009/0138579 A1* | 5/2009 | Jung | 709/221 |
| 2009/0191868 A1* | 7/2009 | Siegel et al. | 455/435.1 |
| 2009/0260064 A1* | 10/2009 | McDowell et al. | 726/4 |
| 2010/0095296 A1* | 4/2010 | Su | 717/178 |
| 2011/0241823 A1* | 10/2011 | Anders | 340/5.8 |
| 2011/0252240 A1* | 10/2011 | Freedman et al. | 713/169 |

\* cited by examiner

Device 124(1)

PREVENTING DEREGISTRATION FROM FLEET ACCOUNTS

BACKGROUND

Business and educational institutions are increasingly seeking to use new technology to connect with their employees and/or students. To this end, these businesses and educational institutions often purchase large fleets of electronic devices to distribute to their employees and/or students. This has been a valuable way for such businesses and educational institutions to distribute information to their employees and/or students.

One problem with distributing these devices is that the employees and/or students typically have the ability to de-register their device from the fleet. This de-registration allows the employee and/or student to do as they please with the device, such as sell the device. These actions may cost the institutions large amounts of money to replace. Another problem occurs when employees and/or students have a device that is not associated with an account and would like to join the fleet to receive the distributed information using that device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example UI displayed on the device after the selection shown in FIG. 5. As illustrated, this UI includes a pop-up menu indicating that the browser application of the device has been disabled by an administration of the account to which the device is associated with.

DETAILED DESCRIPTION

Overview

Figure 1:
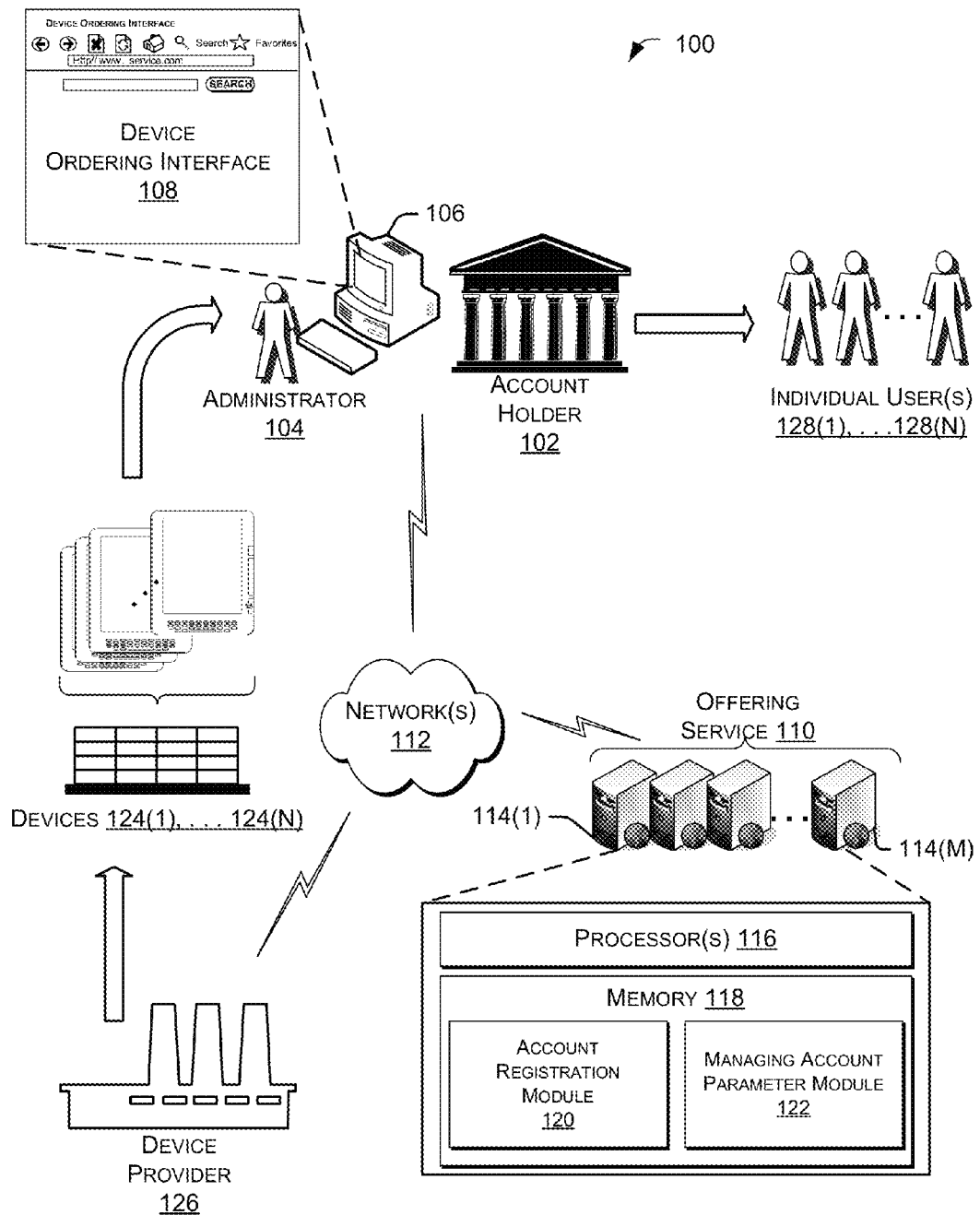
FIG. 1 illustrates an example environment where an administrator of an account holder may purchase a quantity of devices from an offering service. In response, a device provider may compile the quantity of devices for shipment to the administrator, who may distribute the devices to individual users. As described below, the administrator may request that these devices be associated with an account of the account holder in such a way that individual users may not later disassociate individual devices from the account.

This disclosure describes, in part, techniques for managing a fleet of electronic devices. For instance, an administrator of a business or educational institution may place an order with an offering service to purchase a large number of electronic devices, such as electronic book (eBook) reader devices. The offering service may identify that the business or educational institution is ordering a fleet of devices based on the large quantity of devices ordered. In other implementations, the offering service may identify that the business or educational institution is ordering a fleet of devices based on a request received from an administrator, irrespective of the quantity of devices ordered. Furthermore, each of the devices ordered are associated or registered to an account that the administrator is able to control. The devices are compiled and shipped to the account holder, in this example the business or educational institution. The business or educational institution receives and distributes the devices associated with the account to individual users. For example, a business may distribute individual devices to employees of the business, or the educational institution may distribute individual devices to students within an educational institution.

In certain implementations, the offering service receives an indication when a user first powers on one of the devices associated with the account. Based on the signal from the device, the offering service determines that the device is associated with the account and, in response, the offering service sends a signal to the device to prevent disassociation with or de-registration from the account. The signal received by the device acts to alter a setting or component within the device to prevent the individual user from disassociating or de-registering the device from the account.

In other implementations, the administrator of the account holder may wish to implement or configure a preferred setting on each of the devices associated with the account. For instance, the account holder may wish to enable, disable, restrict or block certain applications or functions of each of the devices associated with the fleet account. For example, a school that distributes the fleet devices to students in elementary school may wish to disable the web browser or game applications of each of the devices in the fleet account. In another example, a university may wish to enable each of the devices to access content that is licensed exclusively for use by the university.

In yet another implementation, the administrator of an account may enable each of the devices associated with the account to receive specified content associated with the account. For example, an English Literature class at a university may be associated with a specific text. The administrator of the university would enable each of the devices associated with the English Literature class at the university to have access to the specific text. In other implementations, the administrator of an account my enable each of the devices associated with the account to access the specified content only while connected to a network provided by the account holder. For example, the specific text made available to the English Literature class at a university may only be available to the devices associated with the class while the devices are connected to the university's Wi-Fi network.

As such, the administrator may request to implement the desired preferred setting(s) at the offering service. In response, the offering service sends a signal to each of the devices associated with the account to implement the preferred setting. For example, an administrator of the school account may be given access to a website maintained by the offering service to allow the administrator to manage the account and set preferred settings or parameters based on the school's intended use of the devices. The offering service may then send a signal to the devices to alter settings of the devices for implementing the preferred settings or parameters. In some implementations, an administrator may request to implement the desired preferred setting(s) at the time of requesting the order for the devices. In other implementations, an administrator may request to implement the desired preferred setting(s) at any time after receiving the requested devices or after distributing the devices to individual users.

In addition, the businesses and educational institutions may allow or encourage individual employees and/or students to associate their individually owned devices with the fleet account. As such, the techniques described herein allow users to associate their individual devices with a pre-existing fleet account. Additionally, the techniques described herein allow a user of a device associated with an account to associate the device with another account, group or subgroup within an account. This ability to "opt-in" to a fleet account may be implemented in many ways and can accommodate many models of individually owned devices, as described below.

In one implementation, the offering service issues the administrator of the account holder a unique identifier in the form of a quick response ("QR") code, a bar code an alphanumeric code or a numeric code with this unique identifier corresponding to the account holder's account. In some instances, the offering service may issue the administrator multiple unique identifiers, each corresponding to a group or further sub-group within the business or educational institution.

In certain implementations, the employee or student requests that their individually owned device be associated or registered with an account held by the business or educational institution. To do so, the account holder may make available the unique identifier by, for example, printing off the unique identifier such that the identifier may be scanned or otherwise captured by a device. For instance, a user wishing to associate their individually owned device with the account may scan or capture the unique identifier using a sensor (e.g., a camera, bar code reader, etc.) of the device, which then provides an indication of the captured identifier to the offering service. In response, the offering service would receive the request and identify the account based on the captured image. In some implementations, the offering service would prompt the individually owned device to, for example, connect to a uniform resource locator (URL) specifically associated with the scanned identifier. The URL is displayed on the individually owned device prompting the individual user to associate or register with the account. In other implementations, upon receiving the request to associate the device the offering service will automatically associate the device with the account without the use of a prompt.

In situations where a user wishes to associate a device that does not include a camera or bar code reader, the user may initially request access to the join the account through that device. For instance, a user may direct the browser of their device to a URL associated with an account and select a link to associate the device with the account. Upon making such a request, a unique identifier may be sent for display on the device. The unique identifier (e.g., QR code, bar code, etc.) may be unique to both the account and the device. At this point, the user may use an additional device containing a camera or a bar code reader, such as a smart phone, another eBook reader device, or the like, to capture or scan the identifier displayed upon the device to be associated with the account. The additional device may then provide an indication that it has captured the image to the offering service, which in turn may prompt the additional device or the device to be associated with the account to connect to a specified URL. Upon navigation to this URL, the user could then confirm association or registration of the individually owned device with the account.

In other implementations, the opt-in of a device may be facilitated without the use of the device. For example, the user may access a website maintained by the offering service in order to associate their device with an account, group or sub-group of the account holder. In this example, the device may have already been associated with a user. The user may enter a unique identifier associated with an account, group or sub-group, such as an alphanumeric or a numeric code, at the website maintained by the offering service to associate the device with the account, group or sub-group.

The techniques for managing a fleet account of electronic devices may be implemented in many ways. Example implementations are provided below with reference to the figures.

Illustrative Fleet Device Ordering and Distribution

FIG. 1 is an illustrative architecture 100 for managing a fleet of electronic devices. As illustrated, the architecture 100 includes an account holder 102, such as a business, educational institution, or other entity, that manages an account that is associated with multiple electronic devices. The account holder 102 may be associated with at least one administrator 104, who is able to manage aspects of the account, such as the identity of devices associated with the account, settings implemented by the devices, and the like. Furthermore, administrator 104 may manage aspects including, but not limited to, content and parameter settings associated with each of the multiple devices within each of several groups or sub-groups within the account 102. For example, an administrator may be a principal of an account holder such as an elementary school. The principal may manage the specific content and preferred settings corresponding to devices associated with different grade levels (groups) within the elementary school. Further still, the principal may manage such content or setting corresponding to devices associated with specific teachers with each grade level (sub-groups) within the elementary school.

The administrator 104 may use a computing device 106 to access a device ordering interface 108 from an offering service 110. The offering service 110 may comprise a website or other type of site that is accessible over a network 112 for ordering one or more electronic devices offered for acquisition, such as electronic book (eBook) reader devices, cellular telephones, laptop computers, desktop computers, and the like. Network 112 may be any type of communication network, including the Internet, a local area network, a wide area network, a wireless area network (WWAN), a wireless network, or the like, including combinations of the foregoing.

The computing device 106 is illustrated as a personal computer, but may also be implemented as other devices, such as wireless phones, tablet computers, eBook reader devices, laptop computers, and so forth. The computing device 106 is equipped with one or more processors and memory to store applications and data. A browser or other client application may be stored in the memory and may execute on the processor(s) to provide access to the device ordering interface 108 from the offering service 110.

The device ordering interface 108 from the offering service 110 is hosted on one or more server 114(1), . . . , 114(M), perhaps arranged as a server farm. In some implementations, server 114(1) contains processor 116 and memory 118. As illustrated, memory 118 includes an account registration module 120 to facilitate associating or registering individual devices with an account. The module 120 also includes a managing account parameters module 122 to facilitate implementation of a preferred account setting. For instance, the administrator may utilize the module 122 to implement certain preferred parameters or settings on the individual devices associated with the account.

In the illustrated architecture 100, the offering service 110 receives an order from administrator 104 for a number of eBook reader devices 124(1), . . . , 124(N). Each eBook reader device 124(1)-(N) may have wireless communications technology capable of connecting to and communicating with offering service 110 via network 112. In response to receiving an order for a number of devices, offering service 110 determines whether the number of ordered devices 124(1)-(N) is to be associated with an account of account holder 102. In some implementations the offering service 110 determines that the number of ordered device 124(1)-(N) is to be associated with an account of account holder 102 based whether the number of devices ordered is greater than a threshold number. The threshold number may be 2, 5, 25 or 1000 devices or any other number. In other implementations, the offering service 110 determines that the number of ordered devices 124(1)-(N) is to be associated with account of account holder 102 based on a request from administrator 104 and/or based on any other criteria. For example, at the time of ordering one or more devices, or at any other time thereafter, the administrator 104 may request that the one or more devices be associated with a particular account regardless of the number of devices.

In response to determining that the number of ordered device is to be associated with an account of account holder 102, the offering service 110 associates or registers each of the number of devices with an account of the account holder 102. Again, in some instances, the offering service 110 may first confirm whether the administrator would like to associate the devices with the account. In still other instances, the offering service 110 may allow the administrator 104 the option to associate the devices with an account regardless of the number of ordered devices. In either instance, to associate the ordered devices with the account the offering service 110 may associate device identifiers (e.g., serial numbers, etc.) to the account of the account holder 102 to link the respective devices to the account.

The account of the account holder 102 may be associated with specific content that is made available to each of the associated or registered devices 124(1)-124(N). For instance, when account holder 102 comprises an educational institution, the corresponding account may be associated with certain content for students of the education institutions, such as textbooks, etc. As such, when a particular device is associated with the account, that device may have access to the specific content, as described in further detail below.

After receiving an order for a number of client devices and linking device identifiers to the account, offering service 110 compiles the received order for devices 124(1)-124(N) and communicates with a device provider 126 to coordinate shipment of the devices to the administrator 104 of account holder 102.

Upon receiving the fleet of devices from device provider 126, the account holder 102 may distribute the received devices to individual users 128(1), . . . , 128(N). For example, an elementary school may have a principal acting as the administrator. The principal may distribute each of the devices associated with the elementary school account to each student in a certain fifth grade class.

Thereafter, the offering service 110 may receive an indication over network 112 when one of the distributed devices has been powered on for the first time. The indication may include the device identifier of the device that has been powered on. Responsive to receiving this indication, the offering service 110 may determine that the device identifier of the powered on device has previously been linked to the account associated with account holder 102. If the offering service 110 makes such a determination, the offering service 110 may send a signal via network 112 to the powered on device that alters a setting on the device preventing the device from disassociating or de-registering from the account associated with account holder 102.

In other implementations, the offering service 110 may receive a request from the administrator 104 to implement a preferred setting or parameter on each of devices associated or registered with the account holder 102. In response to receiving the request, the offering service 110 may implement the preferred setting or parameter by communicating over network 112 with each of the devices associated with the account holder 102. In certain implementations, the request from the administrator to implement the preferred setting can be made at the time the order for the devices is placed with the offering service 102. In such circumstances, the communication from the offering service 102 to implement the preferred setting will occur with each of the devices associated with the account holder 102 when each of the devices is first powered on. In other implementations, the request to implement a preferred setting may occur after each of the devices associated with the account holder 102 has been distributed to individual user 128(1)-(N).

In some instances, the preferred settings or parameters comprise disabling a web browser on each respective client device, disabling access to a web-store from each respective client device, requesting that each respective user implement a password for accessing the respective client device, disabling a media player on each respective client device, disabling each respective client device, requesting that each respective user implement a minimum password length for accessing the respective client device, disabling use of a specified wireless network by the respective client device, enabling a wireless network filter for the respective client device, preventing the respective client device from playing a specified game, enabling access to content specific to an account of an account holder, or the like.

Illustrative User Device

Figure 2:
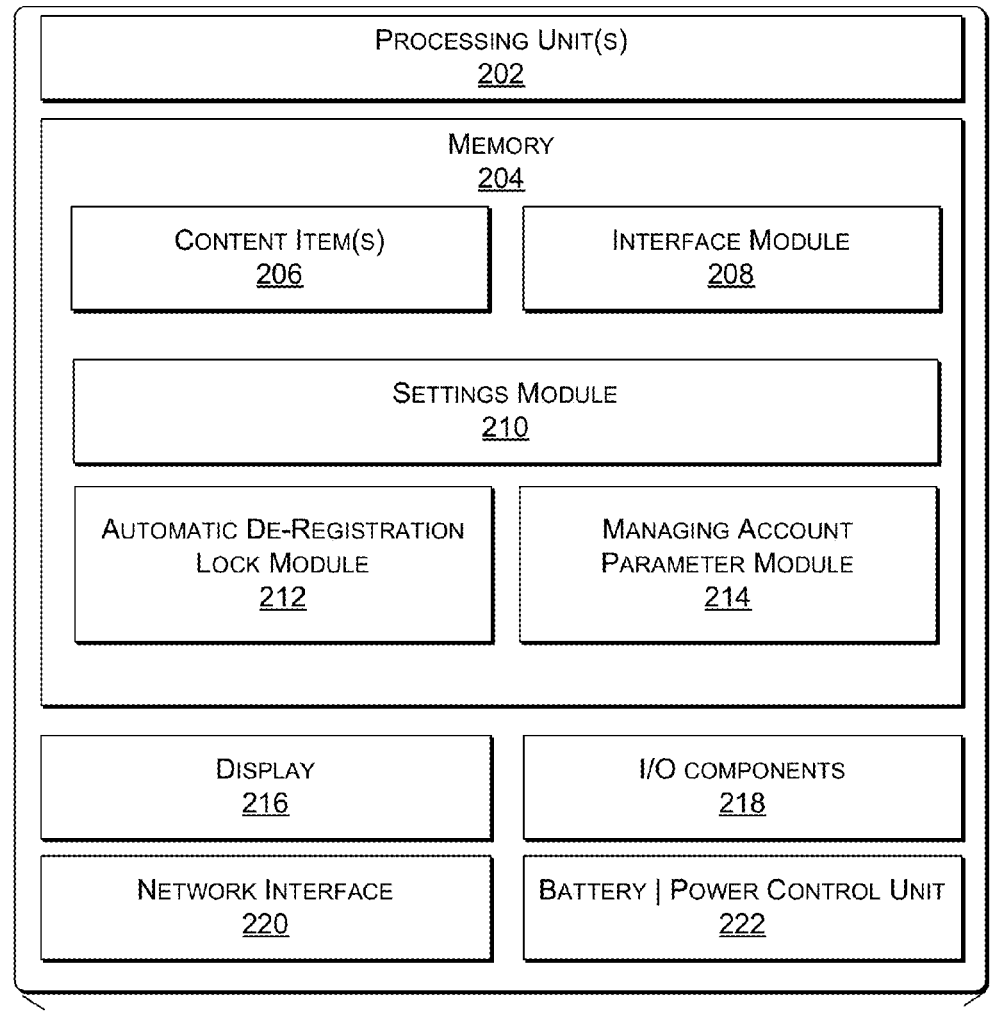
FIG. 2 illustrates example components of one the devices.
Figure 2:
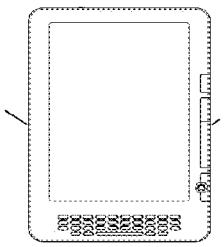

FIG. 2 illustrates example components that might be implemented in device 124(1) of FIG. 1 that may display content associated with an account holder. In this example, the device is shown as a dedicated, handheld eBook reader device, however other electronic devices may implement these techniques and may include some of the functionality described herein.

The basic configuration of device 124(1) includes one or more processing units 202 and memory 204. Depending on the configuration of the device 124(1), the memory 204 (and other memories described throughout this document) is an example of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the device 124(1).

The memory 204 may be used to store any number of functional components that are executable on the processing unit(s) 202, as well as data and content items that are rendered by device 124(1). Thus, the memory 204 may store an operating system and a storage database to store one or more content items 206, such as eBooks, audio books, songs, videos, still images, and the like.

An interface module 208 may also be provided in memory 204 and may be executed on the processing unit(s) 202 to provide for user operation of device 124(1). The interface module 208 may facilitate textual entry of requests (e.g., via a cursor, controller, keyboard, etc.), audible entry of requests (e.g., via a microphone), or entry of requests in any other manner.

The memory 204 may also include a settings module 210 to facilitate personalization of device 124(1) to the user. Example settings stored in the setting module 210 may include device registration, device name, Wi-Fi settings, device password, and the like.

An automatic de-registration lock module 212 may also be provided in memory 204 and may be executed on the processing unit(s) 202 to receive a signal from the offering service over a network, such as network 112. In response to receiving the signal, the module 212 alters the device 124(1) associated with an account and prevents the device 124(1) from disassociating from the account as described with reference to FIG. 1.

A managing account parameter module 214 may be included in memory 204 to receive a signal from network 112 in order to implement a preferred setting requested by the administrator 104 of the account holder 102, also as described above. For instance, when administrator 104 requests to implement a preferred setting on each client device of the corresponding account, the module 214 may receive a signal from the offering service and implement the setting on the device.

FIG. 2 further illustrated that the device 124(1) may include a display 216, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The device 124(1) may further be equipped with various input/output (I/O) components 218. Such components may include various user interface controls (e.g., buttons, a joystick, a keyboard, etc.), a camera, a bar code reader, audio speakers, connection ports, and so forth.

A network interface 220 supports both wired and wireless connection to various networks, such as cellular networks, radio, Wi-Fi networks, short range networks (e.g., Bluetooth), IR, and so forth. The eBook reader device 124(1) also includes a battery and power control unit 222. The battery and power control unit operatively controls an amount of power, or electrical energy, consumed by the device. Actively controlling the amount of power consumed by the reader device may achieve more efficient use of electrical energy stored by the battery.

The device 124(1) may have additional features or functionality. For example, the device 124(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Examples User Interfaces

Figure 3:
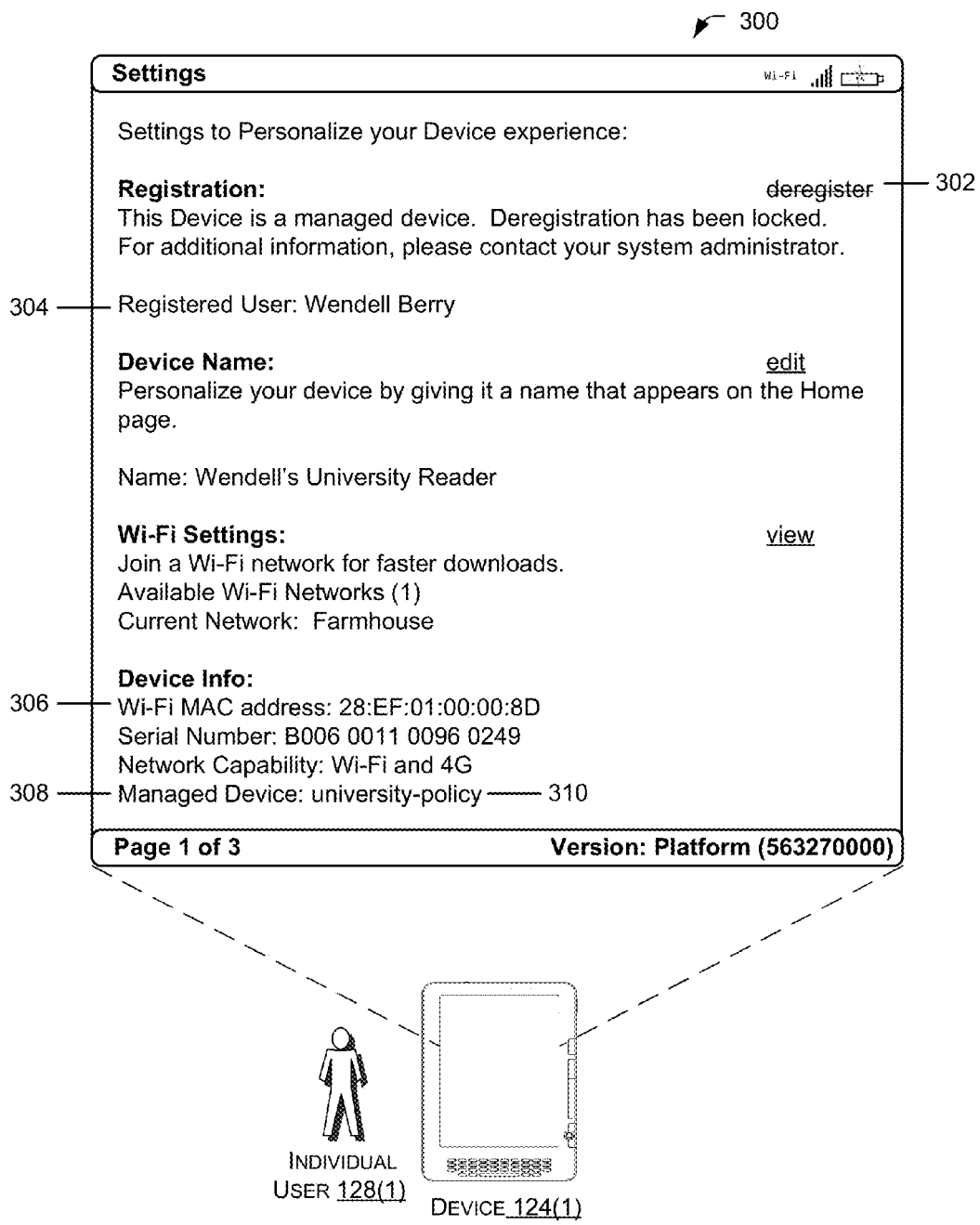
FIG. 3 illustrates an example user interface (UI) displayed on a device that has been locked. As illustrated, the UI indicates that the device may not be deregistered (or disassociated) from the account of the account holder.

FIGS. 3-6 illustrate various example user interfaces displayed on a fleet device. FIG. 3 shows generally the user interface 300 displayed on device 124(1) when individual user 128(1) accesses the settings module 210. In certain implementations, where the device 124(1) has been associated or registered with an account of the account holder 102 the "deregister" function 302 has been locked. In some implementations, the indication that the deregistration function has been disabled can be shown by presenting within interface 300 that the word "deregister" 302 is struck through or grayed out. In other implementations, the deregistration function may not be presented as a selectable option to a user within a user interface. As described above, the de-registration function of the device is automatically configured to lock when the offering service 110 recognizes that the devices are to be associated with an account.

As illustrated in FIG. 3, user interface 300 shows at 304 that the device 124(1) has a registered user named "Wendell Berry". The user interface 300 further shows under "Device Info:" that the device has a serial number 306. The serial number 306 may be used by the offering service 110 as the device identifier to link the device with the account of the account holder 102. User interface 300 also illustrates that this device is a "Managed Device" 308, indicating that the device has been associated or registered with an account. Further, at 310 the user interface 300 illustrates the specific policy ID or specific content of the account holder that accessible by device 124(1). For example, "university-policy" denotes that device 124(1) is associated with an account and can access specific content. This policy may also dictate that the device implements certain preferred parameters associated with the account, such as those set by administrator 104.

Figure 4:
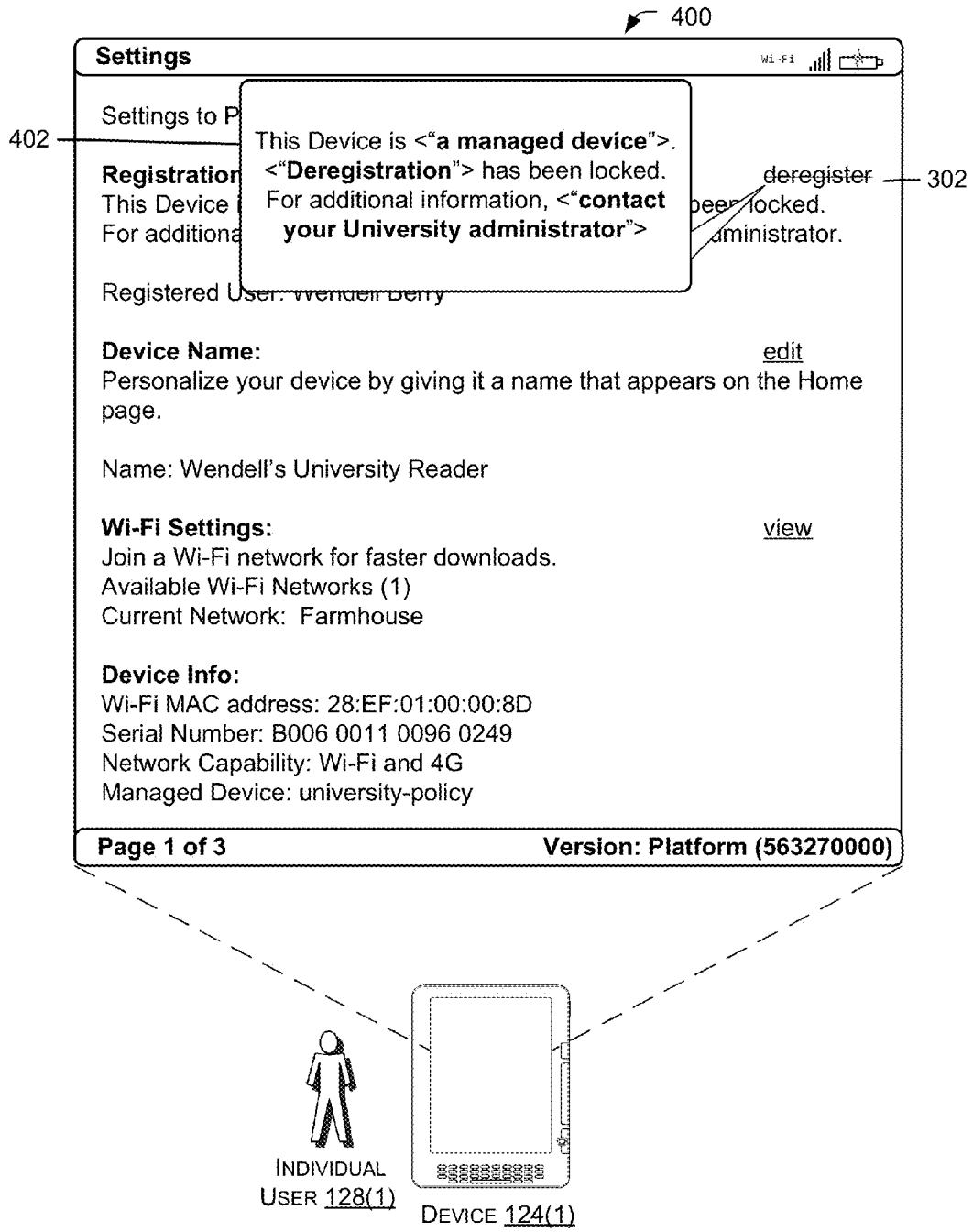
FIG. 4 illustrates another example UI displayed on the device. As illustrated, this UI includes a pop-up menu indicating that the device has been locked and may not be deregistered by a user of the device.

FIG. 4 illustrates an example user interface 400 displayed on device 124(1) in response to individual user's 128(1) selection of "deregister" function 302. In this example, text box 402 may be displayed to Wendell Berry when the "deregister" function 302 is selected. In some implementations, the text within text box 402 may be customizable by an administrator 104 of the account holder 102 to display a preferred message to the user. In this example, text box 402 instructs the user to "contact your University administrator" for additional information regarding registration of the fleet device.

Figure 5:
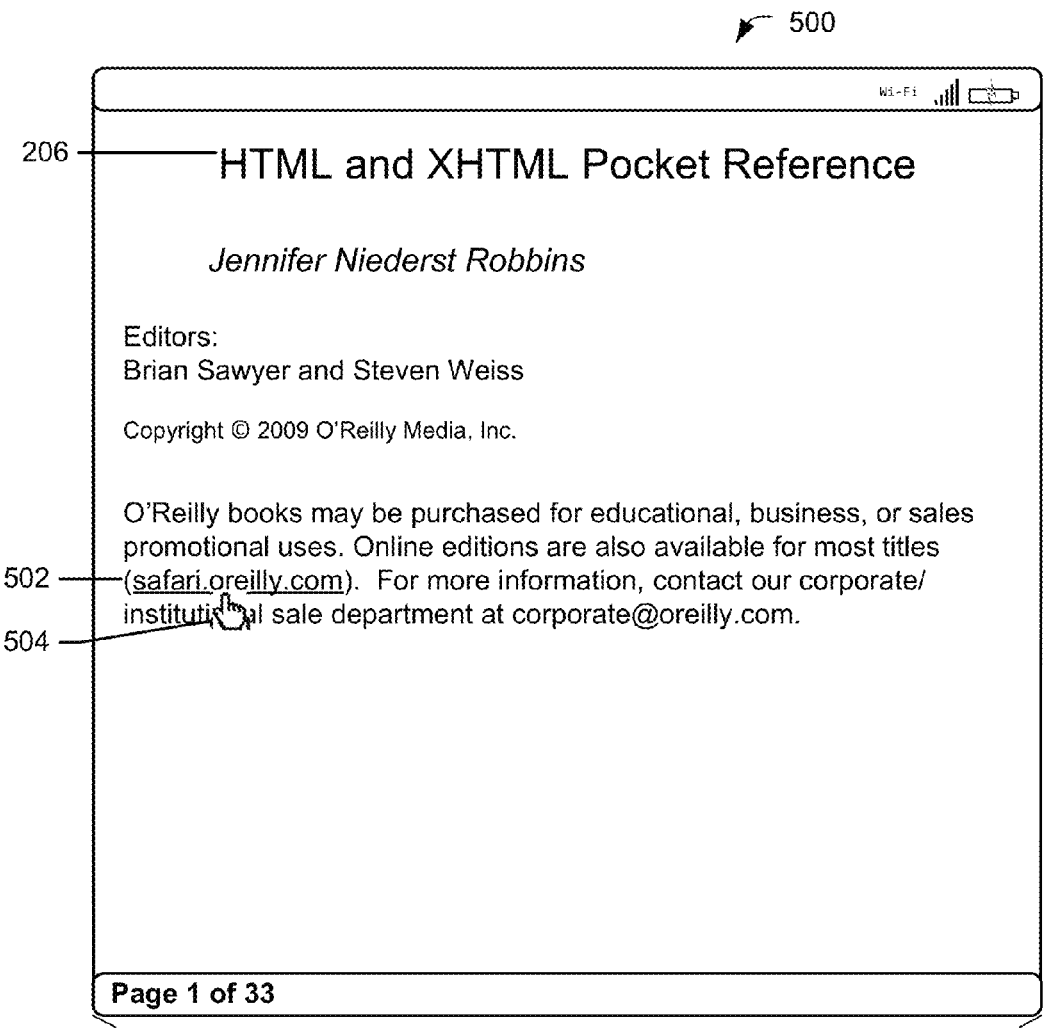
FIG. 5 illustrates an example UI where a user of a device attempts to select a link found within content illustrated on the display. This selection in turn may instruct the device to launch a web browser to access content specified by the link.
Figure 5:
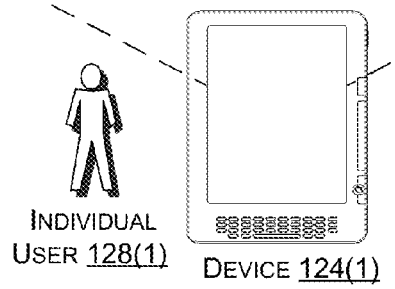

FIG. 5 illustrates user interface 500 displayed on device 124(1). The interface displayed shows an example content item 206 stored within memory 204. In this example, the content item 206 may be an eBook. Specifically, user interface 500 illustrates an eBook with a hyperlink 502 embedded within the text of the eBook. As discussed above, device 124(1) is associated with the account of account holder 102. As such, an administrator 104 of the account holder 102 has the ability to request implementation of a preferred setting on each of the devices associated with the account of the account holder 102. Returning then to FIG. 5, the user interface 500 also illustrates a pointer 504 as depicting a selection of the hyperlink 502 by individual user 128(1).

Figure 6:
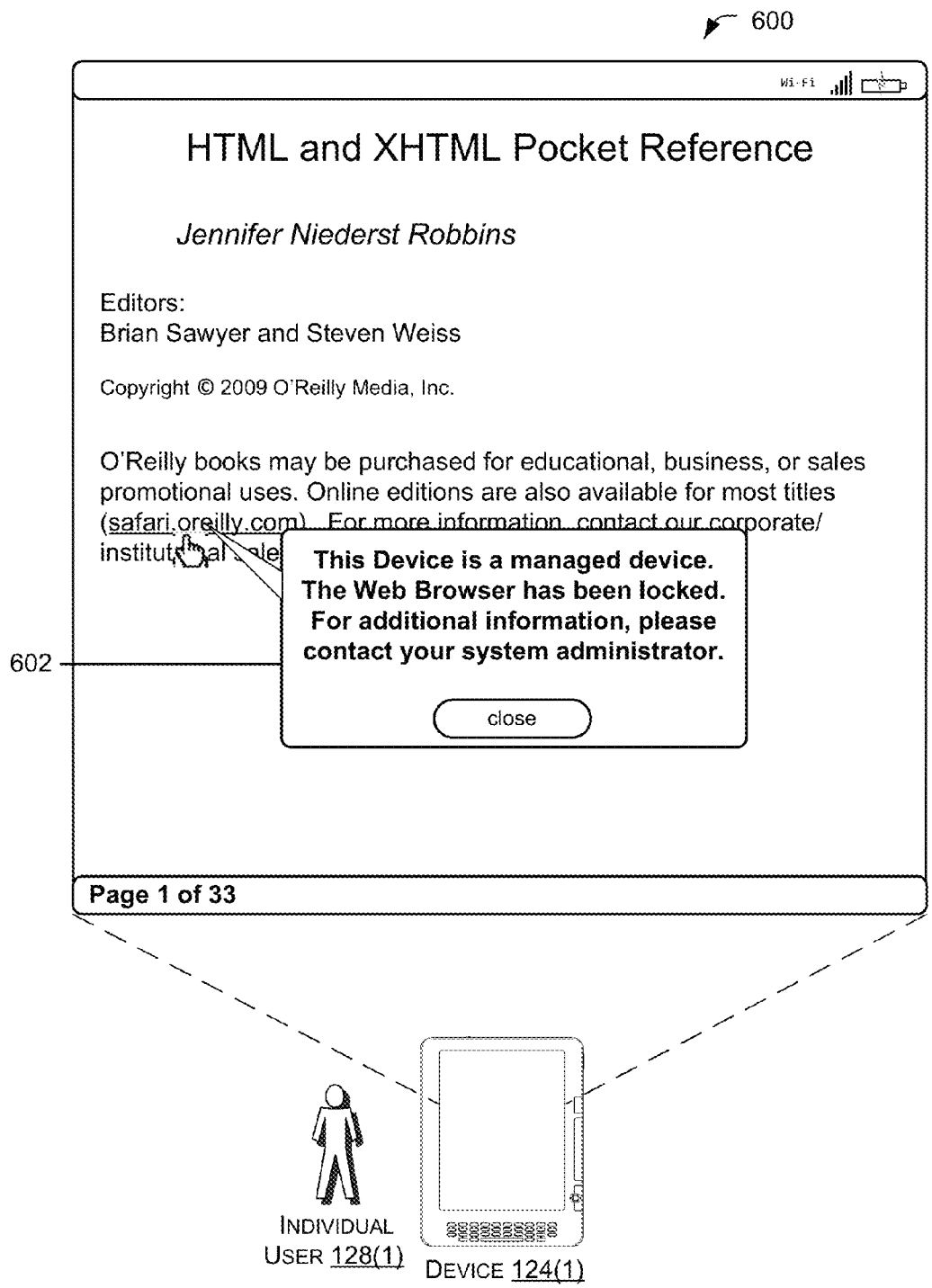

In response to individual user's 128(1) selection of hyperlink 502, FIG. 6 illustrates text box 602 indicating to the individual user 128(1) that the device 124(1) is a "managed device" and that the "web browser has been blocked." The text box 602 being displayed as a response to the administrator 104 of the account holder 102 requesting to the offering service 110 to implement the preferred parameter of disabling the web browser of device 124(1). As discussed above, the message displayed in user interface 600 on device 124(1) to individual user 128(1) is fully customizable by administrator 104 of the account holder 102.

In some implementations, the hyperlink 502 may not be underlined or visible within the user interface 600. In other implementations, in response to individual user's 128(1) selection of the hyperlink 502 or any other restricted account setting, the individual user 128(1) may be prompted with a text box allowing the individual user 128(1) to request that the administrator 104 of the account holder 102 grant the user access to the browser and/or to the specific URL associated with the hyperlink 502.

Illustrative Examples of Allowing Opt-in to Managed Fleet

FIGS. 7-11 illustrate example architecture and user interfaces permitting an individual user to associate or register their individually owner device with an account of an account holder.

In architecture 700, an individual user 702 with a device 704 that may or may not have been registered to an account, group or sub-group of account holder 102 may request to register the device 704 with the account, group or sub-group of account holder 102. In some implementations, device 704 may already be associated with a group or sub-group of an account holder. In that case, individual user 702 is requesting to associate device 704 with an additional group, or sub-group within the account of an account holder.

Figure 7:
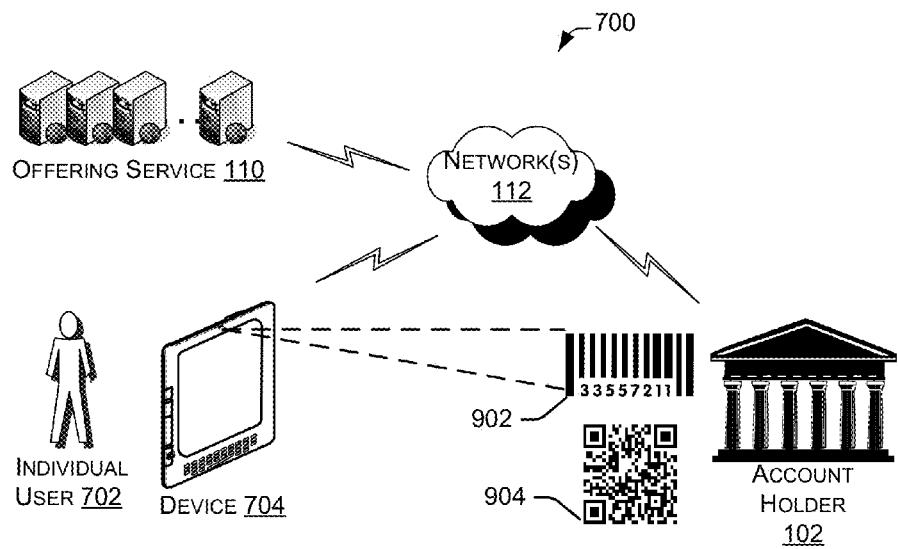
FIG. 7 illustrates an example where a user requests that a device by associated with the example account by capturing an image associated with account using the device.

As illustrated in FIG. 7, the request comprises receiving, by the offering service 110, an indication via network 112 that individual user 702 has captured or scanned an image. In some implementations, the image may comprise a quick response code 706 or a bar code 708. The image is unique to the respective account, group or sub-group of the account holder 102. The scanning or capturing may be facilitate by the input/output components 218 such as a camera or bar code reader as described with reference to device 124(1) above.

For example, a student who already owns an eBook reader device can request to register or opt-in to an account of a university by utilizing their eBook reader device to take a picture of an image associated with the university. In some implementations, the university may have previously received from the offering service an image, such as a QR code, for display on a class blackboard. In other implementations, an image may be printed from a web-page maintained by the offering service 110 and posted by the account holder 102 at any location. In other implementation, the image may be displayed on a web-page maintained by an administrator of the university.

Returning to FIG. 7, the image is received by the offering service 110 which identifies the account, group or sub-group of the account holder 102 that corresponds to the image captured by device 704. In some implementations, upon identifying that the device 704 has captured an image associated with the account, the offering service 110 directs the display of device 704 to a uniform resource locator (URL) which prompts the individual user 702 to accept or decline associating the device 704 with the identified account of account holder 102. In other implementations, upon identifying that the device 704 has captured an image associated with the account, the offering service 110 automatically associates the device 704 with the identified account.

Figure 8:
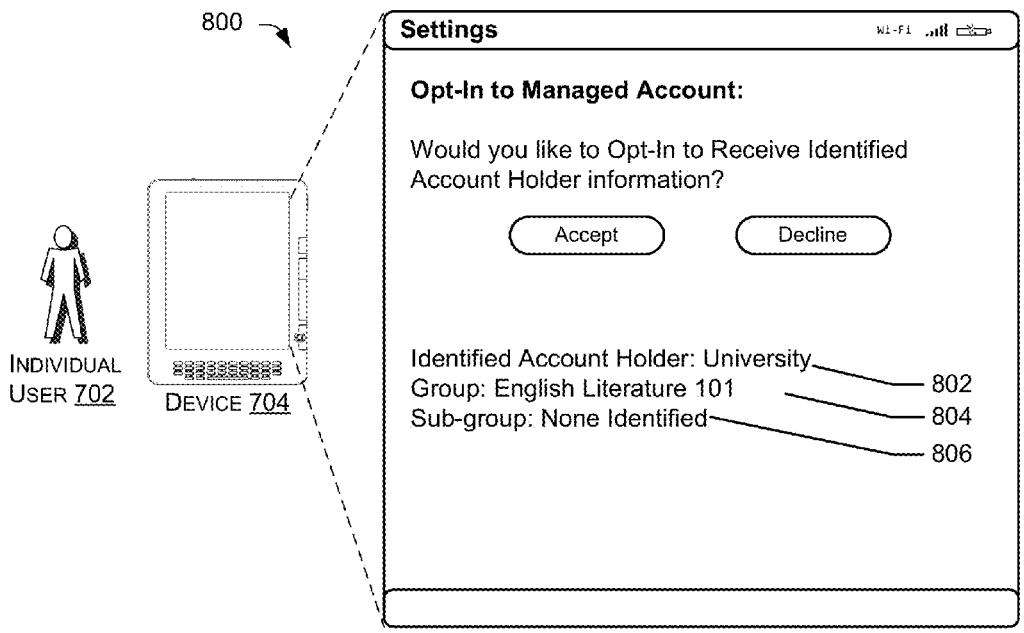
FIG. 8 illustrates an example UI that the device may receive and display after sending the request to associate the device with the account.

FIG. 8 illustrates an example user interface 800 displayed on device 704. As illustrated and discussed above, this interface is a confirmation prompting individual user 702 to accept or decline association or registration with the account associated with the captured image. User interface 800 also illustrates the identified account holder 102 associated with the captured image. Further, and as will be discussed, user interface 800 also illustrates a group 804 or a further sub-group 806 within the account of the account holder associated with the captured image.

Figure 9:
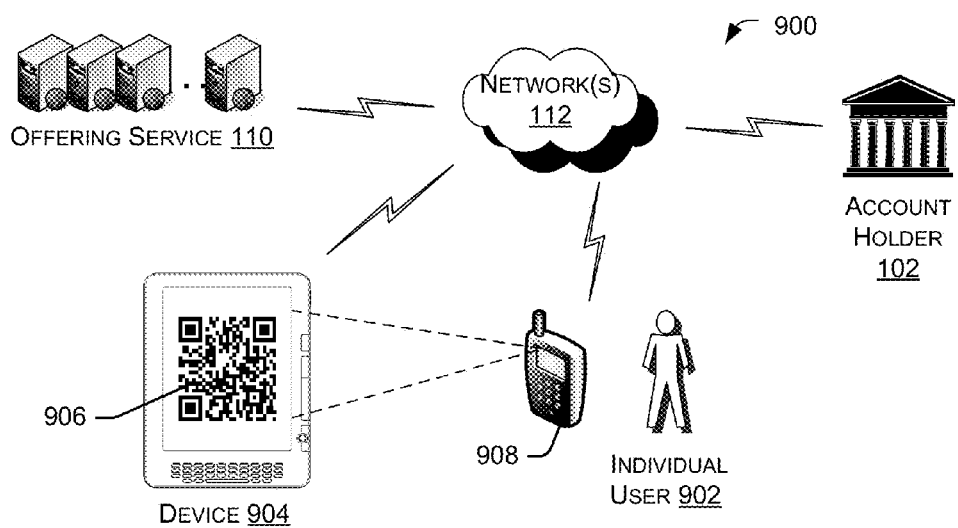
FIG. 9 illustrates an example where a user requests that a first device be associated with the account and, in response, the first device receives an image associated with the account and unique to the first device. The user may then capture the image using, for instance, a camera of a second device and may send the image back to the offering service. Upon receiving the image associated with the account and unique to the first device, the offering service may associate the first device with the account.

FIG. 9 illustrates architecture 900 where individual user 902 requests to associate device 904 with an account. In this architecture, device 904 may be owned by individual user 902 and may or may not have already been associated with the account, group, or sub-group of the account holder 102. Furthermore, the device 904 does not contain the input/output components such as a camera or bar code reader necessary to capture an image as described above. Here, individual user 902 using device 904 requests from offering service 110 to associate or register the device 904 with an account, group or sub-group of account holder 102. Upon receive such request, offering service 110 sends or transmits an image 906 over network 112 for display on device 904. In some implementations, the image 906 may be a QR code, a bar code, or the like. The image 906 being unique to device 904.

As illustrated in FIG. 9, after the image 906 is displayed on device 904, individual user 902 may use an external or additional device 908 to capture the image 906. The additional device 908 is illustrated as a smart phone, but may also be implemented as another device, such as a PDA, tablet computer, eBook reader device, laptop computer, and so forth. The additional device 908 may be equipped with one or more processors and memory to store applications and data. A browser application may be stored in the memory and executes on a processor to provide access to the offering service 110 via network 112. After the additional device 908 captures the image 906, the additional device 908 sends an indication that it has captured the image to the offering service 110 over network 112.

Figure 10:
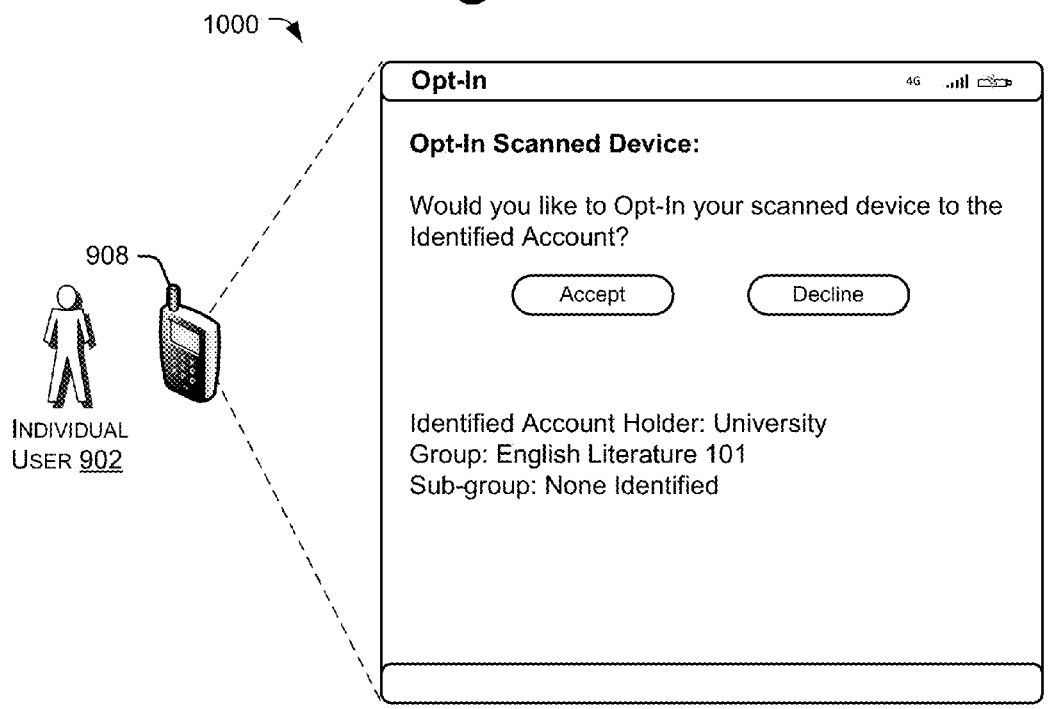
FIG. 10 illustrates an example UI that the first device may receive and display after the second device shown in FIG. 9 sends the request to the offering service.

As illustrated in FIGS. 9-10, the offering service 110 receives the indication that the image 906 has been captured by the additional device 908, and in certain implementations, directs the display of the additional device 908 to a uniform resource locator (URL) which prompts the individual user 902 to accept or decline associating the device 904 with identified account, group or sub-group of account holder 102. In other implementations, upon identifying that the additional device 908 has captured an image associated with the account, group or sub-group, the offering service 110 automatically associates the device 904 with the identified account, group or sub-group.

In some implementations, after the "opt-in" techniques described above, the individual users 702 and 902 may request to later disassociate their respective devices 704 and 904 from an account, group or sub-group of account holder 102. For instance, a student who has associated their personal device with a specific course at a university may wish to disassociate from that course if the student later decides to withdraw from the course or university. In this example, the individual user 702 or 902 would send a request to the offering service 110 via a website to disassociate the respective device 704 and 904 from an account, group or sub-group of account holder 102. Upon receiving the request, the offering service 110 may disassociate the device from the account.

In some implementations, when individual user 702 or 902 requests to disassociate with an account, group, or sub-group of account holder 102, the offering service 110 or administrator 104 may remove access to specific content associated with the now disassociated account, group or sub-group from the respective devices 704 and 904. Using the above example, a student who decides to associate their device with a specific course offered by a university may later decide to disassociate from the course. However, if the associated device had access to specific content, such a textbook, by way of the association with the course, upon disassociation the student's device might no longer have access to such textbook. Of course, in other examples the device retains access to any such content associated with the account.

Figure 11:
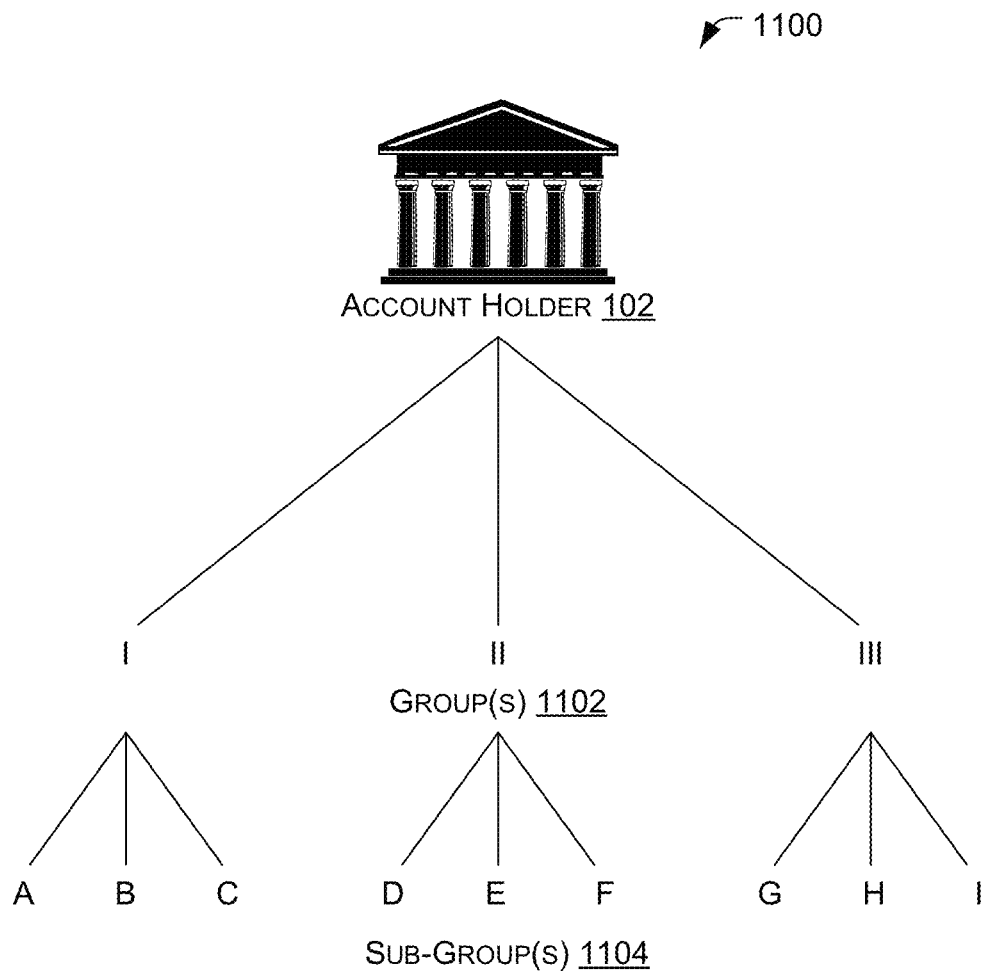
FIG. 11 illustrates a tree diagram demonstrating that the account of the account holder may include multiple groups. Further the groups may include multiple sub-groups.

FIG. 11 is a tree diagram 1100 where an account of an account holder 102 includes multiple groups 1102. Further, each group 1102 may contain multiple sub-groups 1104. The account holder 102 would be the manager of the account. However, each group or sub-group could be a separate account within the management of the account holder 102. In some implementations, each group or sub-group may have a different administrator to facilitate management by the account holder 102. In some implementations, each group or sub-group within the account is associated with specific content that is made accessible to the devices that are also associated or registered with the account. In some implementations, a device may be associated or registered with multiple account holders or multiple groups or sub-groups within an account.

For example, the account holder may be a university, which may offer many different individual courses such as Biology 101, Calculus 302, Physical Chemistry, or the like. Each individual course within the university would be a group within the university account. Each individual course may be associated with specific content and policies that differs from other individual courses within the university account. An individual course may contain further sub-groups. For example, Biology 101 may be divided into multiple section containing different student or different professors. Each sub-group may be associated with specific content and policies that differ from other sub-groups within a group of an account.

Example Processes

Figure 12:
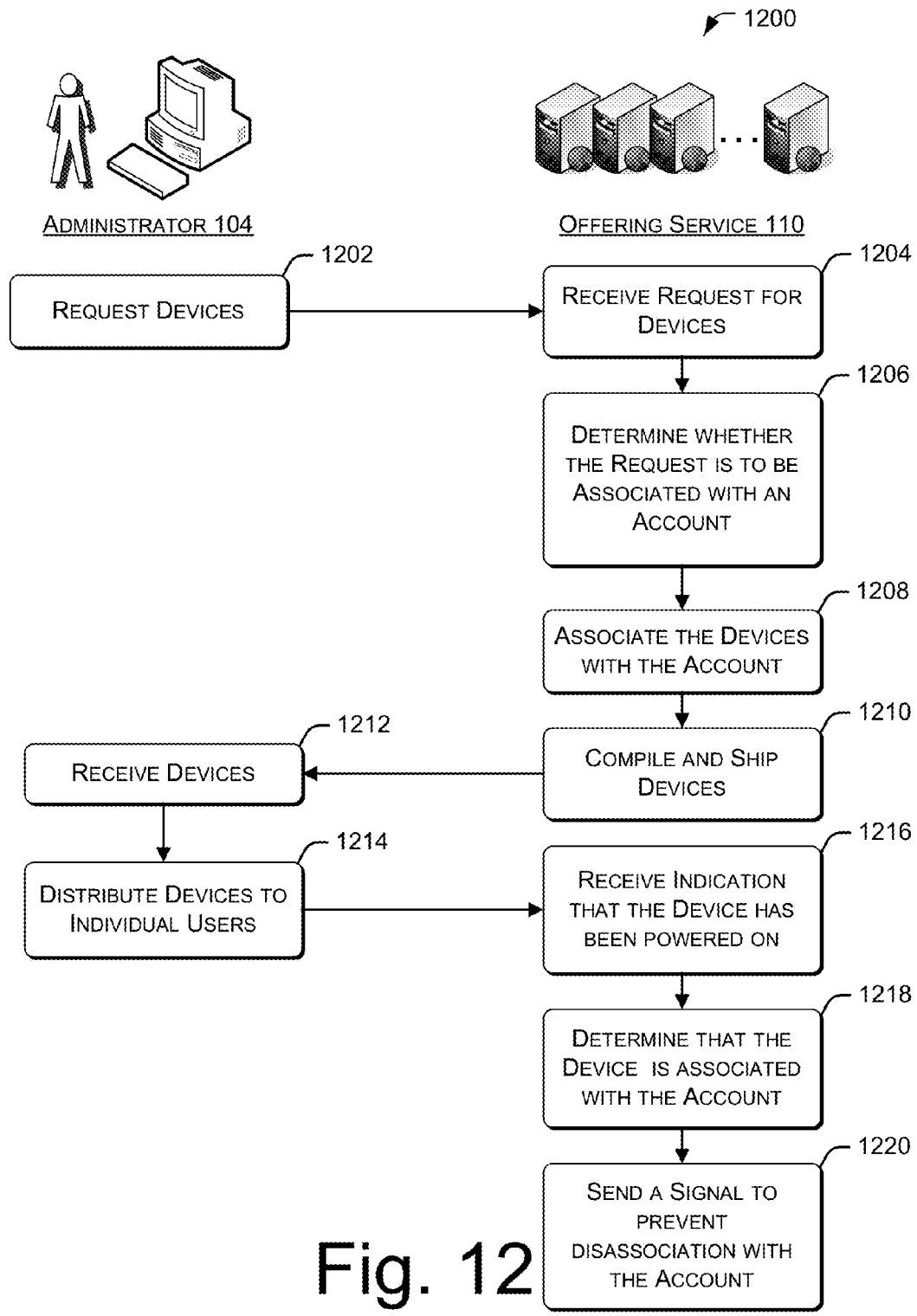
FIG. 12 illustrates an example flow diagram of the process for automatically locking a device from de-registering from an account.

FIG. 12 illustrates an example process 1200 for implementing the techniques described above of associating an order for a threshold number of devices with an account. Actions underneath the administrator 104 or individual user 702 or 902 may be performed by the administrator or users, respectively. While actions illustrated under offering service 110 may be performed by the offering service 110.

The process 1200 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 1202, the administrator 104 requests devices from offering service 110. At 1204, offering service receives the request and determines whether the request is to be associated with an account at 1206. At 1208, if the number of devices requested is to be associated with the account, the offering service 110 associates a number of devices equal to the requested number with the account associated with the administrator 104. The devices are then compiled and shipped at 1210. In some instances, offering service 110 provides the devices to the account holder (e.g., administrator 104), while in other instances the offering service utilizes a device provider that is separate from offering service 110.

At 1212, the administrator 104 receives the devices from the offering service 110 and distributes each of the devices to individual users at 1214. For instance, if the administrator is associated with an account holder such as a university, the devices may be distributed to individual users such as professors or students within a certain English Literature course. At 1216, the offering service 110 receives an indication that a device has been powered on for the first time. At 1218, the offering service 110 determines if that device is associated with the account associated with the administrator 104 and, if so, sends a signal at 1220 to prevent the device from disassociation from the account.

Figure 13:
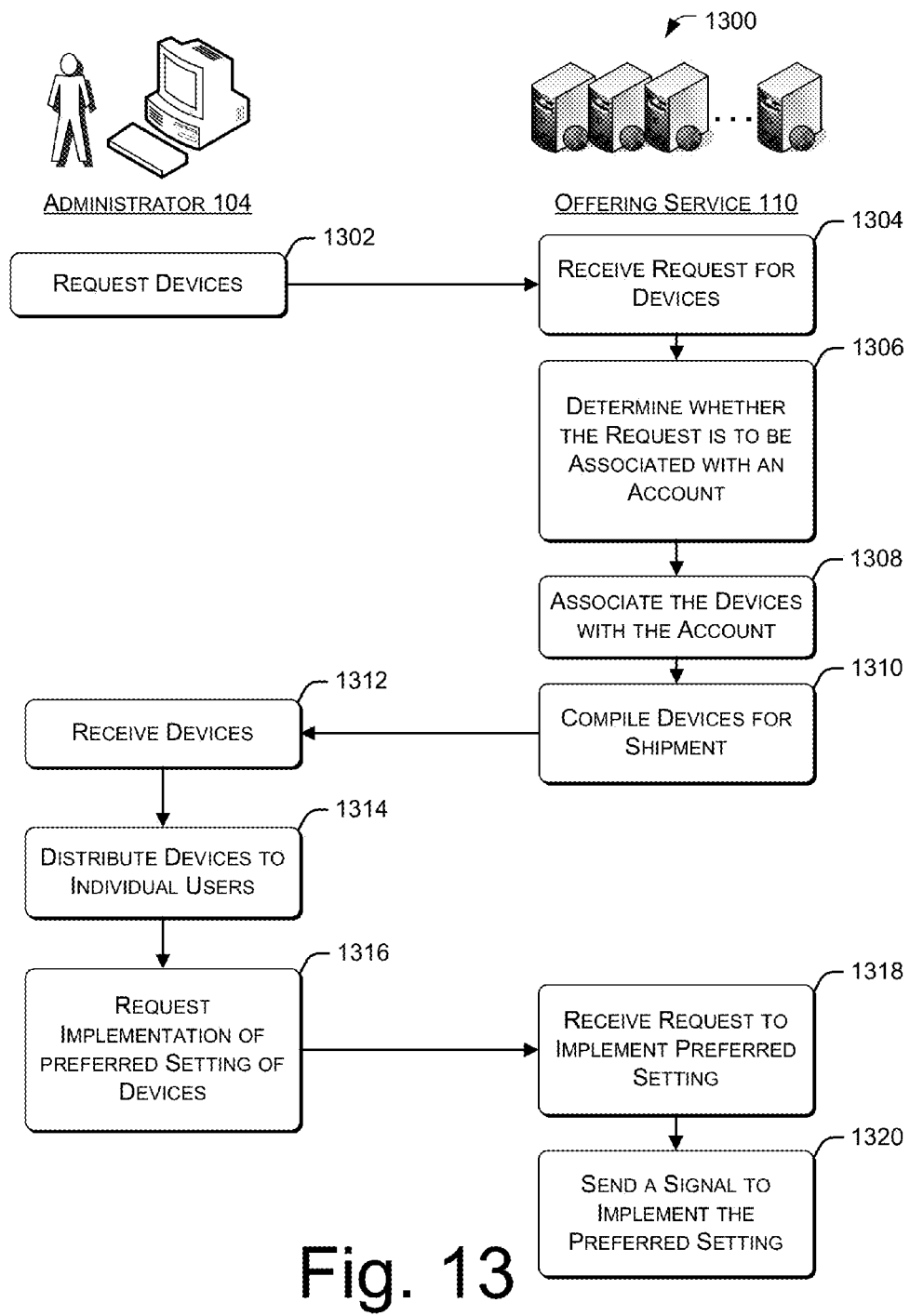
FIG. 13 illustrates an example flow diagram of the process for allowing the administrator of an account to implement a preferred setting of across each device registered with the account.

FIG. 13 depicts a flow diagram of another example process 1300. At 1302, the administrator 104 of an account requests devices from offering service 110. At 1304, the offering service 110 receives the request and determines, at 1306, whether the request is for a number of devices is to be associated with an account. If so, then at 1308 the offering service 110 associates each of the devices with the account and compiles the devices for shipment at 1310.

At 1312, the administrator 104 receives the devices from the offering service 110 and distributes each of the devices to individual users at 1314. At 1316, the administrator 104 requests implementation of a preferred setting on each of the devices associated with the account. As discussed above, the request can be implemented in a number of ways and at any time. At 1318, the offering service 110 receives the administrator's request to implement the preferred settings and, at 1320, sends a signal to implement the preferred setting.

Figure 14:
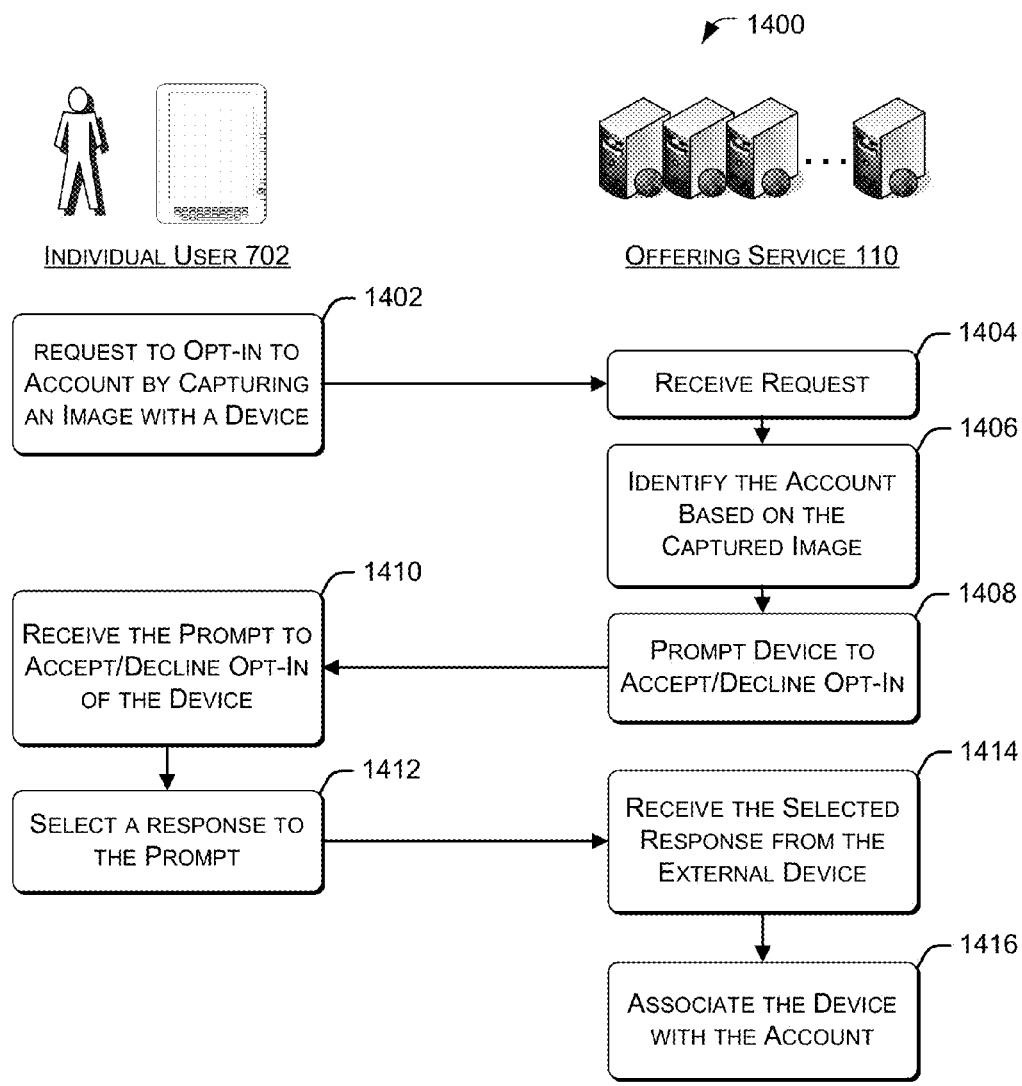
FIGS. 14-15 illustrate example flow diagrams of the various processes for allowing an individual user to associate an additional device to an account.

FIG. 14 depicts a flow diagram of another example process 1400. At 1402, the individual user 702 requests to opt-in or associate with an account by capturing an image with a device. At 1404, the offering service receives the request and identifies the account based on the captured image at 1406. At 1408, the offering service 110 prompts the device to accept or decline the opt-in. The individual user receives the prompt and selects a response to the prompt to opt-in at 1410 and 1412, respectively. At 1414, the offering service 110 receives the selection of the individual user 702 and, at 1416, associates the device with the account if the response indicates that the user so requests.

Figure 15:
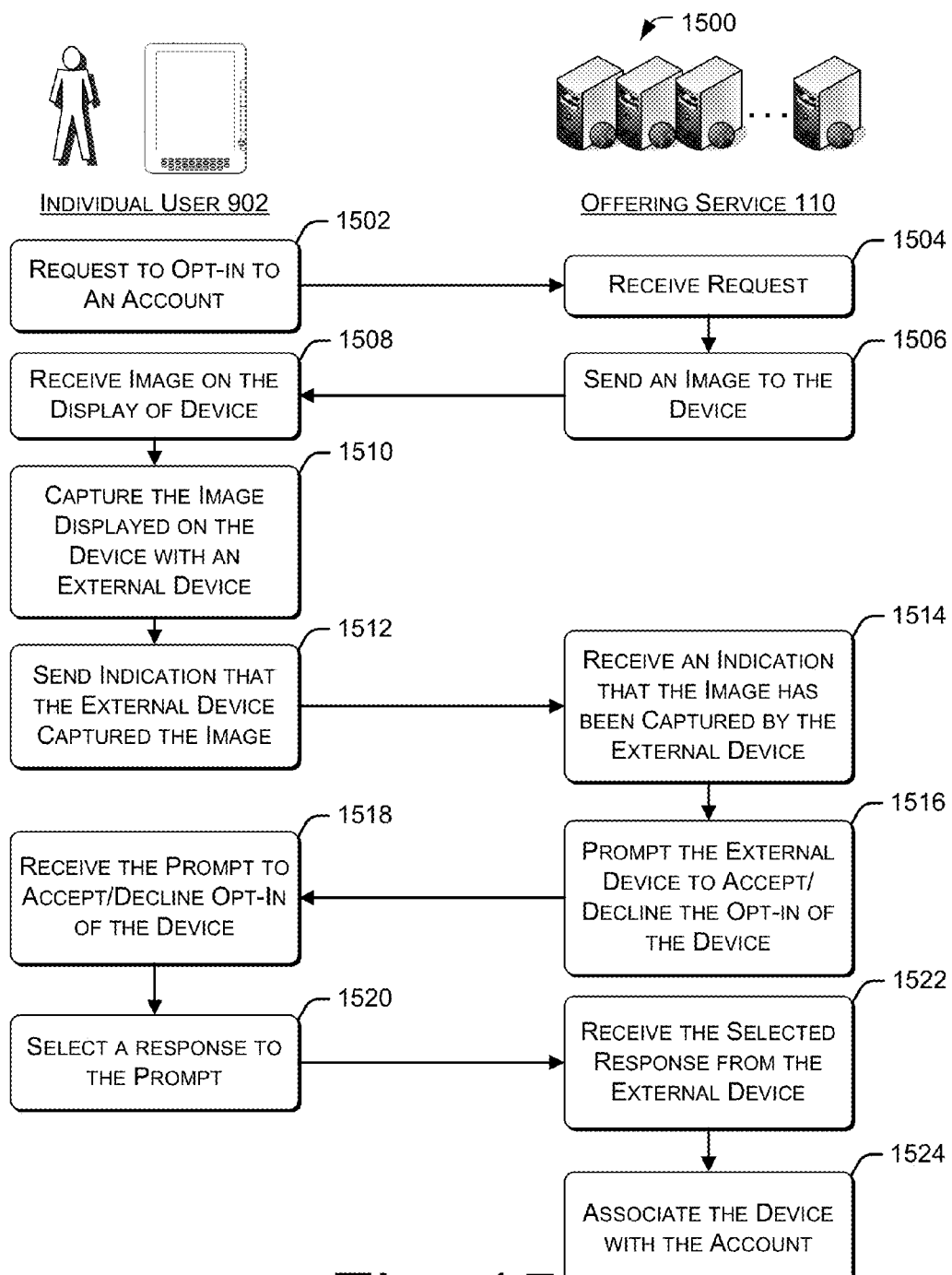

Finally, FIG. 15 depicts a flow diagram of another example opt-in process 1500. In process 1500, at 1502, the individual user 902 uses a device to request to opt-in or associate that device with an account. At 1504 and 1506, the offering service receives the request and sends an image for display the device. As discussed in detail above, this image is unique to the both the account and the device it is displayed upon. At 1508, the individual user 902 receives the image for display on the device. At 1510, the individual user 902 captures the image displayed on the device with an additional device. At 1512, an indication is sent that the additional device has captured the image.

At 1514, the offering service 110 receives the indication that the image has been captured by the additional device. In response, at 1516, the offering service 110 prompts the additional device or the device to be associated with the account to accept or decline the opt-in or association of the device with the account. At 1518, the additional device or the device to be associated with the account receives the prompt and, at 1520, the user selects a response to the prompt. At 1522, the offering service 110 receives the selection of the individual user 702 and, at 1524, associates the device initially used to make the request with the account if the response so indicates.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A method comprising:
    under control of one or more computing systems configured with executable instructions,
    receiving an order for one or more client devices;
    determining whether a particular client device of the one or more client devices is to be registered with an account; and
    at least partly in response to determining that the particular client device of the one or more client devices is to be registered with the account:
        registering the particular client device with the account; and
        sending configuration instructions to the particular client device of the one or more client devices, the configuration instructions adapted to modify one or more settings of the particular client device to prevent the particular client device from deregistering from the account.

2. The method of claim 1, wherein the account is associated with specified content, the specified content being accessible by client devices that are registered with the account.

3. The method of claim 1, wherein the account is associated with multiple sub-groups, a first sub-group of the multiple sub-groups associated with first content accessible by a first group of devices and a second sub-group of the multiple sub-groups associated with second content accessible by a second group of devices.

4. The method of claim 1, wherein determining that the particular client device of the one or more client devices is to be registered with the account further comprises determining that the one or more client devices include multiple client devices and that a number of client devices is greater than a threshold number.

5. The method of claim 1, wherein the one or more client devices are for distribution to individual users and the account is managed by at least one administrator, the method further comprising:
    receiving a request from the at least one administrator to configure one or more settings on individual client devices of the one or more client devices; and
    sending instructions to configure the one or more settings on the individual client devices of the one or more client devices at least partly in response to receiving the request from the at least one administrator.

6. The method of claim 1, wherein the particular client device of the one or more client devices is associated with a device identifier, the registering the particular client device comprises registering the device identifier with the account, and the method further comprises:
    receiving, over a network, an indication when the particular client device is first powered on, the indication including the device identifier of the particular client device; and
    determining that the device identifier has been registered with the account;
    wherein the sending of configuration instructions includes sending the configuration instructions to the particular client device at least partly in response to determining that the device identifier has been registered with the account.

7. The method of claim 1, the method further comprising:
    receiving, from an additional client device, a request to register the additional client device with the account; and
    at least partly in response to receiving the request, registering the additional client device with the account.

8. The method of claim 1, further comprising:
receiving a request for a locked action associated with the one or more settings; and
based at least partly on the request, causing display of a locked action indicator at the particular client device.

9. A system comprising:
one or more processors; and
one or more computer readable media storing computer-executable instructions that, when executed on the one or more processors, cause the one or more processors to perform acts comprising:
receiving a request to register one or more client devices with an account;
registering individual client devices of the one or more client devices with the account in response to the request; and
in response to registering a particular client device of the one or more client devices, sending configuration instructions to the particular client device, the configuration instructions adapted to modify one or more settings of the particular client device to prevent the particular client device from deregistering from the account.

10. The system of claim 9, wherein the account is associated with specified content, the specified content being accessible by client devices that are registered with the account.

11. The system of claim 10, wherein the account is managed by an educational institution or a business.

12. The system of claim 10, wherein the account is associated with multiple sub-groups, wherein a first sub-group of the multiple sub-groups is associated with first content accessible by a first group of devices and wherein a second sub-group of the multiple sub-groups is associated with second content accessible by a second group of devices.

13. The system of claim 9, wherein the one or more client devices are for distribution to individual users and the account is managed by at least one administrator, the acts further comprising:
receiving a request from the at least one administrator to configure one or more settings on the particular client device of the one or more client devices; and
sending configuration instructions to configure the one or more settings on the particular client device of the one or more client devices at least partly in response to receiving the request from the at least one administrator.

14. The system of claim 13, wherein the sending comprises communicating with the particular client device of the one or more client devices over a network after distributing the particular client device to an individual user.

15. The system of claim 13, wherein the configuration instructions are further adapted to modify one or more settings of the particular client device to: disable a web browser on the particular client device, disable access to a web-store from the particular client device, request that a user implement a password for accessing the particular client device, disable a media player on the particular client device, disable the particular client device, request that a user implement a minimum password length for accessing the particular client device, disable use of a specified wireless network by the particular client device, enable a wireless network filter for the particular client device, enable access to specific content, or prevent the particular client device from playing a specified game.

16. The system of claim 13, wherein the configuration instructions are further adapted to modify one or more settings of the particular client device to disable the particular client device.

17. The system of claim 9, wherein the particular client device of the one or more client devices is associated with a device identifier, the registering the particular client device comprises registering the device identifier with the account, and the acts further comprise:
receiving, over a network, an indication when the particular client device is first powered on, the indication including the device identifier of the particular client device;
determining that the device identifier has been registered with the account; and
wherein the sending of configuration instructions includes sending the configuration instructions to the particular client device at least partly in response to determining that the device identifier has been registered with the account.

18. The system of claim 9, the acts further comprising sending a message for display on the particular client device of the one or more client devices, the message indicating that the particular client device may not be deregistered from the account.

19. The system of claim 9, the acts further comprising:
receiving, from an additional client device, a request to register with the account;
sending an image for display on the additional client device;
receiving an indication that a device other than the additional client device has captured the image displayed on the additional device; and
registering the additional client device with the account.

20. The system of claim 19, wherein the image comprises a quick response (QR) code or a bar code that identifies the account.

21. The system of claim 19, wherein the image comprises a quick response (QR) code or a bar code that identifies the account and the additional client device.

22. The system of claim 19, the acts further comprising:
receiving a request from the additional client device to deregister the additional device from the account; and
at least partly in response to receiving the request, deregistering the additional client device from the account.

23. An apparatus comprising:
a display; and
one or more processors configured to perform acts comprising:
sending a first signal to an account server that is remote from the apparatus, the first signal configured to register the apparatus to an account managed, at least in part, by the account server;
at least partly in response to the sending of the first signal, receiving a second signal from the account server; and
at least partly in response to the receiving of the second signal, configuring the apparatus to prevent the apparatus from being deregistered from the account.

24. The apparatus of claim 23, the acts further comprising updating, at least partly in response to the receiving of the second signal, at least one setting of the apparatus, the at least one setting specified by an administrator of the account.

25. The apparatus of claim 23, wherein the first signal is sent when the apparatus is first powered on.

26. The apparatus of claim 23, the acts further comprising:
requesting to register with a second account, the requesting comprising capturing an image associated with the second account;
sending the captured image to the account server;

receiving a third signal from the account server, the third signal causing the apparatus to prompt a user of the apparatus to register the apparatus with the second account; and register the apparatus with the second account at least partly in response to receiving a selection of the prompt from the user.

27. The apparatus of claim 26, the acts further comprising:
sending, to the account server, a request to deregister from the second account; and
receiving a fourth signal from the account server, the fourth signal causing the apparatus to deregister from the second account.

28. The apparatus of claim 23, the acts further comprising:
requesting to register with a second account; and
receiving, from the account server, an image on the display of the apparatus that is unique to the second account and the apparatus.

29. The apparatus of claim 23, the acts further comprising:
presenting, via the display, a first indication indicating that a deregistration function is locked, wherein locking of the deregistration function prevents deregistration of the apparatus from the account;
receiving a request to activate the deregistration function; and
based at least partly on the request, presenting, via the display, a second indication indicating that the device cannot be deregistered from the account.

* * * * *